United States Patent Office 3,836,571

Patented Sept. 17, 1974

3,836,571
ETHYLENICALLY UNSATURATED DERIVATIVES OF 4-AMINOBENZOIC ACID

Martin Skoultchi, Somerset, and Eric A. Meier, North Brunswick, N.J., assignors to National Starch and Chemical Corporation, New York, N.Y.

No Drawing. Original application Aug. 17, 1970, Ser. No. 64,574, now Patent No. 3,666,732. Divided and this application Mar. 7, 1972, Ser. No. 232,530
Int. Cl. C07c 101/62
U.S. Cl. 260—471 R 2 Claims

ABSTRACT OF THE DISCLOSURE

Ethylenically unsaturated derivatives of 4-aminobenzoic acid are prepared by a novel method involving the reaction under controlled conditions of 4-aminobenzoic acid and various derivatives thereof with allyl chloride. The resulting monomers may, thereafter, be copolymerized with a wide variety of conventional ethylenically unsaturated, i.e. vinyl, monomers. The monomeric derivatives as well as the copolymers prepared therefrom are ultraviolet absorbers in the 280–320 millimicrons range and find a particular utility as a sun-screen agent in suntan formulations.

RELATED APPLICATIONS

This application is a division of copending application Ser. No. 64,574, filed Aug. 17, 1970, now U.S. Pat. 3,666,732, issued May 30, 1972, and assigned to the assignee of the instant application.

This invention relates to a novel method of preparing diallyl derivatives of 4-aminobenzoic acid and substituted 4-aminobenzoic acids and their esters and to the monomeric compounds thereof as well as to the polymerization of said compounds with vinyl-type monomers. In a further aspect, the invention also relates to suntan lotions and the like utilizing the described compounds. In another aspect, the invention relates to a novel method of preventing sunburn.

Sunburn, or erythema as it is identified by the medical profession, results from the excessive exposure of human skin to either the rays of the sun or to sun lamps which produce ultra-violet radiation similar to natural sunlight. In order to prevent entirely or substantially reduce sunburn while nonetheless promoting the development of a suntan, various so called "suntan" formulations are available which are adapted to be applied over the body areas which are to be exposed. These formulations all generally contain a so called "sun-screen" agent whose primary function is to absorb the wavelengths of light in the range of from about 280–320 millimicrons which cause sunburn while transmitting those wavelengths in the range of from about 320–350 millimicrons which produce a desirable suntan.

Among the various chemical compounds which have been utilized as sun-screen agents for suntan formulations, one may mention ethyl p-aminobenzoate, propyl p-aminobenzoate, glyceryl p-aminobenzoate, isobutyl p-aminobenzoate, ethyl p-glucosylimidobenzoate, 2-ethoxyethyl p-methoxycinnamate, and various alkyl and aryl substituted cinnamates. All of these prior art sun-screen agents may thus be readily characterized as relatively low molecular weight, non-polymeric, organic compounds.

The prime object of this invention is to provide a new class of monomeric and polymeric compounds characterized by their strong absorbance in the range of 280–320 millimicrons. A further object of this invention is to provide a method of preparing the new compounds and a method of preventing sunburn while permitting the development of a suntan.

Various other objects and advantages of this invention will be apparent upon a reading of the disclosure which follows hereinafter.

The novel method of this invention provides a means of preparing diallyl derivatives of 4-aminobenzoic acid and substituted 4-aminobenzoic acids and their esters corresponding to the formula:

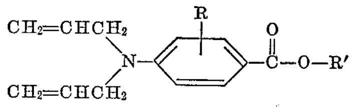

wherein R is a radical selected from the group consisting of hydrogen, lower alkyl and aryl radicals; and R′ is a radical selected from a group consisting of hydrogen or lower alkyl or hydroxyalkyl radicals. Suitable lower alkyl groups are those having up to about 4 carbon atoms.

As representative of the above described monomeric derivatives, one may list the following compounds:

4-(N,N-diallylamino) benzoic acid;
2-methyl-4-(N,N-diallylamino) benzoic acid;
3-methyl-4-(N,N-diallylamino) benzoic acid;
2-ethyl-4-(N,N-diallylamino) benzoic acid;
3-ethyl-4-(N,N-diallylamino) benzoic acid;
2-propyl-4-(N,N-diallylamino) benzoic acid;
3-propyl-4-(N,N-diallylamino) benzoic acid;
2-n-butyl-4-(N,N-diallylamino) benzoic acid;
3-n-butyl-4-(N,N-diallylamino) benzoic acid;
2-isobutyl-4-(N,N-diallylamino) benzoic acid;
3-isobutyl-4-(N,N-diallylamino) benzoic acid;
2-sec-butyl-4-(N,N-diallylamino) benzoic acid;
3-sec-butyl-4-(N,N-diallylamino) benzoic acid;
2-t-butyl-4-(N,N-diallylamino) benzoic acid;
3-t-butyl-4-(N,N-diallylamino) benzoic acid;
2-phenyl-4-(N,N-diallylamino) benzoic acid;
3-phenyl-4-(N,N-diallylamino) benzoic acid;
methyl 4-(N,N-diallylamino) benzoate;
ethyl 4-(N,N-diallylamino) benzoate;
propyl 4-(N,N-diallylamino) benzoate;
n-butyl 4-(N,N-diallylamino) benzoate;
isopropyl 4-(N,N-diallylamino) benzoate;
isobutyl 4-(N,N-diallylamino) benzoate;
sec-butyl 4-(N,N-diallylamino) benzoate;
(2′,3′-dihydroxypropyl) 4-(N,N-diallylamino) benzoate;
methyl 2-methyl-4-(N,N-diallylamino) benzoate;
methyl 3-methyl-4-(N,N-diallylamino) benzoate;
methyl 2-phenyl-4-(N,N-diallylamino) benzoate;
ethyl 2-methyl-4-(N,N-diallylamino) benzoate;
ethyl 3-methyl-4-(N,N-diallylamino) benzoate;
ethyl 2-phenyl-4-(N,N-diallylamino) benzoate;
n-propyl 2-methyl-4-(N,N-diallylamino) benzoate;
n-propyl 3-methyl-4-(N,N-diallylamino) benzoate;
isopropyl 2-methyl-4-(N,N-diallylamino) benzoate;
isopropyl 3-methyl-4-(N,N-diallylamino) benzoate;
(2′,3′-dihydroxypropyl) 2-methyl-4-(N,N - diallylamino) benzoate;
(2′,3′-dihydroxypropyl) 3-methyl-4-(N,N - diallylamino) benzoate; etc.

The monomeric compounds of the present invention are ordinarily obtainable as crystalline materials having characteristic melting points and absorption spectra. They are appreciably soluble in many organic solvents such as aromatic hydrocarbons, alcohols, ketones, esters, and the like. They are, however, generally insoluble in water and in aliphatic hydrocarbons. The unsubstituted and substituted 4-aminobenzoic acid compounds suitable for use in preparing the diallyl derivatives of this invention correspond to the formula:

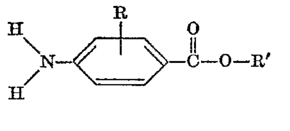

wherein R and R′ are as described above.

The actual preparation of the described monomeric compounds according to the novel process of this invention is carried out by reacting 2 moles, or preferably a slight stoichiometric excess in the order of 10 to 20%, by weight, of allyl chloride with 1 mole of an unsubstituted or substituted p-aminobenzoic acid in an alkaline, aqueous reaction medium. The aqueous medium is made alkaline by the use of any common base such as sodium hydroxide, potassium hydroxide, ammonium hydroxide, sodium carbonate, potassium carbonate, ammonium carbonate, sodium bicarbonate, potassium bicarbonate, and the like, employing the base in approximately an equivalent concentration or a concentration up to about a 20% excess. The reaction is preferably carried out with agitation at temperatures ranging from about 25 to 60° C. although it can be appreciated that temperatures exceeding this range are likewise operable, particularly when a pressurized reactor is utilized. The reaction is carried to completion ordinarily within a period of from about 1 to 24 hours depending upon the reaction temperature. While it is preferable to admix the allyl chloride to the alkaline medium containing the 4-aminobenzoic acid reagent, it should be emphasized that the use of a particular sequence in admixing the reactants is not critical and the sequence may be altered, if desired.

At the end of the reaction period, the reaction mixture is ordinarily allowed to cool to room temperature and the resultant crude product which is usually in the form of a solid is recovered as, for example, by filtration. The product may thereafter be used in its unpurified, crude form, or if desired, it may conveniently be purified by recrystallization from suitable solvents such as lower alkanol-water mixtures.

In utilizing the described diallyl 4-aminobenzoic acid derivatives in the preparation of copolymers, there may be employed any of the usual vinyl polymerization methods which are well known to those skilled in the art and which is particularly suited for the copolymer whose preparation is desired. Thus, such polymers may be prepared by means of free radical inititiated processes utilizing bulk, suspension, solution, or emulsion polymerization techniques; or they may be prepared by ionic catalysts or by means of stereospecific catalysts such as those of the type developed by Ziegler.

The comonomers which may be utilized together with monomeric derivatives of this invention for the preparation of the ultra-violet absorbing copolymers can be any copolymerizing ethylenically unsaturated monomer such, for example as the acrylic, methacrylic, itaconic, and crotonic acids; the alkyl esters of acrylic and methacrylic acids; the hydroxyalkyl esters of acrylic and methacrylic acids; acrylamide; acrylonitrile; methacrylonitrile; styrene and α-methylstyrene; isoprene; butadiene; ethylene; propylene; the $C_1$–$C_4$ alkyl mono- and diesters of maleic and fumaric acids; vinyl acetate; vinyl propionate; vinyl chloride; vinyl fluoride; vinylidene chloride; n-vinyl pyrrolidone; etc. Any of these monomers can be used alone or in combination with one another together with one or more of the described diallyl 4-aminobenzoic acid derivatives.

In order to display its properties of ultra-violet absorbance, the copolymers of this invention should contain at least about 0.1%, by weight, of these diallyl 4-aminobenzoic acid derivatives.

In order to provide copolymers which will function efficiently as sun-screen agents in suntan formulations, it is necessary that the copolymer contain from about 1 to 50%, by weight of moieties derived from at least one of the described diallyl 4-aminobenzoic acid comonomers. The moieties derived from the other copolymerizable ethylenically unsaturated comonomers may thus be present in the copolymer in a range of from about 50 to 99%, by weight. It is to be noted that since it may be desirable in preparing suntan formulations to employ sun-screen agents which are alkali soluble, and therefore easily removable by washing when desired, the copolymers used for this purpose should contain at least about 5%, by weight, of an ethylenically unsaturated acidic comonomer, such as described above.

The novel copolymers of the present invention, whether prepared by means of bulk, suspension, solution, or emulsion polymerization techniques or by other means, are all characterized by their ultra-violet absorbance in the 280–320 millimicrons range, i.e. their ability to absorb the ultra-violet wave lengths which cause sunburn while transmitting those wavelengths which promote tanning.

It is to be noted, most surprisingly, that copolymerization of the monomeric derivatives of the present invention requires the presence of two allyl groups on the 4-aminobenzoic acid derivatives, i.e. copolymerization will take place only with the diallyl derivatives. Monoallyl 4-aminobenzoic acid and related compounds cannot be copolymerized to any significant degree. Even more surprising, however, is the fact that only one allyl group of the diallyl monomer actually enters into the copolymerization. Thus, while it is now known that the N,N-diallyl configuration is necessary for copolymerization, no explanation can be offered as to why only one of these allyl groups enters into the copolymerization and why the comparable monoallyl compounds will not undergo copolymerization.

In incorporating these polymeric sun-screen agents into suntan formulations, a variety of procedures may be employed depending upon the type of suntan formulation which is desired by the practitioner. Thus, for example, it is possible to prepare such formulations in the form of organic solvent solutions, aqueous emulsions, solid gels, or in so-called "aerosol" formulations which are dispensed, under pressure, as a spray by means of a propellant, usually halogenated hydrocarbon. For overall convenience, however, it has been found desirable to prepare the polymeric sun-screen agent initially in the form of a solution lacquer in an organic solvent such, for example, as ethanol or isopropanol. Such lacquers may then be directly utilized, upon the addition of various optional ingredients, or they may be readily converted into any of the above noted physical forms.

Illustrative of the various optional ingredients which may be included in suntan formulations are oils, fats, waxes, emulsifiers, surfactants, perfumes, silicone fluids, pigments, dyes, preservatives, etc.

In essence, the suntan formulations of this invention will contain the sun-screen polymer which is admixed, dispersed or dissolved, together with the desired optional ingredients, in the vehicle component of the formulation comprising a cosmetically acceptable vehicle such, for example, as water, organic solvent, oil, fat, cream or gel, or any mixtures thereof.

With respect to porportions, as previously noted, the sun-screen polymer should contain at least about 1%, by weight, of moieties derived from an ethylenically unsaturated ultra-violet absorbing compound and at least 5%, by weight, of moieties derived from an acidic comonomer, where the presence of such an acidic comonomer is desired. The suntan formulations should be prepared so as to contain sufficient copolymer to provide at least about 0.02%, by weight, of moieties derived from the ethylenically unsaturated ultra-violet absorbing compounds. The maximum concentration of these ultra-violet absorbing compounds, will, of course, be dependent upon economic considerations as well as the degree of sun screening which is desired.

The following examples will illustrate the embodiment of this invention. In these examples, all parts given are by weight unless otherwise noted.

EXAMPLE I

This example illustrates the preparation of 4-(N,N-diallylamino) benzoic acid, i.e.

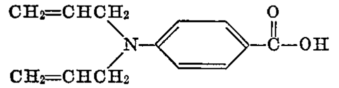

by means of the process of this invention.

To a mixture of 6 liters of water, 1105 grams of anhydrous potassium carbonate (8.0 moles) and 1096 grams of 4-aminobenzoic acid was added rapidly 1360 grams (17.6 moles) of allyl chloride and the resultant mixture was stirred at temperatures ranging from 25 to 60° C. for a period of 18 hours. At the end of this period the allyl chloride layer had disappeared and the pH of the solution had dropped below 7.0. Upon being cooled to room temperature, the resulting reaction product, which was in the form of precipitated solid, was recovered by filtration. Recrystallization of the tan solid from 6700 milliliters of 85% aqueous methanol yielded 1320 grams of purified product, 4-(N,N-diallylamino) benzoic acid, as a white solid having a melting point of 132.5 to 134.5° C.

In a repetition of the above procedure employing minor variations in proportions and conditions, a mixture of 510 parts of allyl chloride, 411 parts of 4-aminobenzoic acid and 496 parts of potassium carbonate in 1000 parts of water was agitated and heated at a temperature of 40° C. for a period of 4 hours and thereafter the temperature was raised to 95° C. for an additional 1 hour period. The mixture was then cooled to room temperature and filtered. The crude product was purified by recrystallization from 85% aqueous methanol and yielded 505 parts of purified product as a white solid having a melting point of 132 to 134° C.

EXAMPLE II

This example illustrates the preparation of ethyl 4-(N,N-diallylamino) benzoate, i.e.

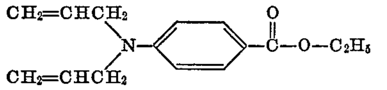

A mixture of 2000 parts of water, 600 parts of potassium bicarbonate, 495 parts of ethyl 4-aminobenzoate, and 505 parts of allyl chloride was agitated and heated at a temperature of 60° C. for a period of 24 hours. The resulting reaction product was recovered by filtration and purified by recrystallization from 85% aqueous methanol. A yield of 440 parts of purified ethyl 4-(N,N-diallylamino) benzoate was obtained. A saponification equivalent run on the product indicated a purity of about 99%.

EXAMPLE III

This example illustrates the preparation of additional ethylenically unsaturated monomeric derivatives of 4-aminobenzoic acid typical of this invention.

Each of the compounds of this invention listed in the table below were prepared by means of the procedure described in Example I, utilizing the listed ingredients and reaction conditions.

TABLE I

| Monomer product | Ingredients | Reaction time (hours) | Temperature (° C.) |
|---|---|---|---|
| Monomer A: 2-methyl-4-(N,N-diallylamino benzoic acid. | 151 parts of 2-methyl-4-aminobenzoic acid, 168 parts of allyl chloride. | 16 | 55 |
| Monomer B: 3-t-butyl-4-(N,N-diallylamino) benzoic acid. | 193 parts of 3-t-butyl-4-aminobenzoic, 168 parts of allyl chloride. | 24 | 60 |
| Monomer C: methyl-2-phenyl-4-(N,N-diallylamino) benzoate. | 227 parts of methyl-2-phenyl-4-amino-benzoate, 168 parts of allyl chloride. | 24 | 55 |

EXAMPLE IV

This example illustrates the preparation of one of the novel copolymers of this invention by means of a solution polymerization technique.

A 4-necked flask equipped with a reflux condenser, dropping funnel, thermometer and means for mechanical agitation was charged with 100 parts of isopropanol, 0.5 parts of azobisisobutyronitrile, and 5 parts of 4-(N,N-diallylamino) benzoic acid. The dropping funnel was charged with a mixture consisting of 15 parts acrylic acid, 45 parts of hydroxypropyl acrylate, and 35 parts of methyl acrylate. About 10%, by volume, of the monomer mixture in the funnel was added to the flask and the resultant mixture was heated to reflux temperatures. The remaining portion of the monomer mixture was added to the flask at periodic intervals over a period of 2 hours. At the completion of the monomer addition, an additional 0.5 parts of azobisisobutyronitrile was added to the flask and the mixture was maintained at reflux temperatures for an additional period of 6 hours. The resulting viscous solution was cooled and a solids analysis indicated a 100% conversion of the monomers to the polymer. A dried film of the polymer displayed a strong absorbance in the 280–320 millimicrons range as well as complete solubility in an aqueous alkaline soap solution.

EXAMPLE V

This example illustrates the preparation of additional novel copolymers of this invention by means of a solution polymerization technique.

A total of 3 copolymers of this invention as identified below in Table II were prepared employing reactants and reaction conditions as described therein essentially by means of the polymerization procedure described in the previous example.

TABLE III

| Monomers | Solvent | Catalyst | Reaction time (hours) | Percent conversion |
|---|---|---|---|---|
| Polymer A: 83 parts hydroxyethyl acrylate, 10 parts acrylic acid 7 parts ethyl 4-(N,N-diallylamino)benzoate. | Ethanol | t-Butyl hydroperoxide-ascorbic acid. | 8 | 99 |
| Polymer B: 60 parts ethyl methacrylate, 20 parts methacrylic acid, 20 parts 4-(N,N-diallylamino) benzoic acid. | Isopropanol | Azobisisobutyronitrile | 10 | 100 |
| Polymer C: 55 parts hydroxypropyl acrylate, 38 parts methyl acrylate, 5 parts acrylic acid, 2 parts 2-methyl-4-(N,N-diallylamino) benzoic acid. | n-Propanol | do | 6 | 100 |

EXAMPLE VI

This example illustrates the preparation of one of the copolymers of this invention by means of an aqueous polymerization technique.

An aqueous latex of a (50:30:10:10) methyl methacrylate:ethyl acrylate:acrylic acid:(4-N,N-diallylamino) benzoic acid polymer was prepared by charging the following ingredients into a reactor equipped with a reflux condenser and means for mechanical agitation.

| | Parts |
|---|---|
| Ethyl acrylate | 60 |
| Methyl methacrylate | 100 |
| Acrylic acid | 20 |
| 4-(N,N-diallylamino) benzoic acid | 20 |
| Sodium lauryl sulfate | 3 |
| Sodium dodecylbenzene sulfonate | 4 |
| Sodium bisulfide | 0.4 |
| Ammonium persulfate | 0.5 |
| Water | 200 |

The above mixture was heated at 40–55° C. for a period of 5 hours which resulted in a latex having a resin solids content of about 50%, by weight.

Films obtained from this latex exhibited an excellent absorbance in the 280–320 millimicrons range when exposed to ultra-violet radiation.

EXAMPLE VII

This example illustrates the preparation of a typical suntan formulation containing one of the novel polymeric sun-screen agents of this invention. In this instance, the suntan formulation was prepared in the form of an ethanol based lacquer.

The particular polymeric sun-screen agent utilized in this formulation was the (45:35:15:5) hydroxypropyl acrylate:methyl acrylate:acrylic acid:4-(N,N - diallylamino) benzoic acid copolymer which had been prepared as described in Example IV except in the form of an ethanol lacquer, containing about 50%, by weight, of resin solids.

The preparation of the suntan formulation was completed by first diluting the initial polymer lacquer with anhydrous ethanol whereupon the various ingredients given below were introduced. Thus, the final composition of the formulation was as follows:

| | Parts |
|---|---|
| Ethanol solution of the above-described polymer (50% resin solids, by weight) | 1.4 |
| Anhydrous ethanol | 23.6 |
| Glycerin | 1.0 |
| Isopropyl myristate | 3.0 |
| Perfume | Trace |

In using the suntan formulation, it was found that after having been applied to the user's body, it was not removed after bathing in either fresh or salt water but it was, on the other hand, readily washed off by the application of soap and water. The use of this formulation provided full protection against sunburn while, nonetheless, permitting the user to develop an excellent suntan.

In a repetition of the above procedure, a comparable suntan formulation was prepared which in this case contained a polymeric sun-screen agent comprising a (60:20:20) ethyl methacrylate:acrylic acid:4-(N,N-diallylamino) benzoic acid terpolymer which had been prepared in the form of an isopropanol lacquer. The resultant formulation likewise displayed excellent ultraviolet absorbance and solubility characteristics.

EXAMPLE VIII

This example illustrates the preparation of a suntan formulation containing another of the sun-screen agents of this invention which formulation, in this instance, was prepared in the form of a so-called aerosol.

The polymeric sun-screen agent utilized in this formulation was a (45:40:10:5) hydroxypropyl acrylate:-methyl acrylate-acrylic acid:4-(N,N - diallylamino) benzoic acid polymer which was prepared in the form of an isopropanol lacquer. The preparation of the aerosol formulation was completed by first diluting the initial copolymer lacquer with anhydrous ethanol and admixing the perfume with the resultant solution whereupon the propellant was introduced and the container sealed. Thus, its final composition was as follows:

| | Parts |
|---|---|
| Isopropanol solution of the above-described polymer (50%, resin solids, by weight) | 2.6 |
| Anhydrous ethanol | 44.3 |
| A 60:40 mixture of trichlorofluoromethane and dichlorodifluoromethane (propellant) | 53.1 |
| Perfume | Trace |

In actual use, the described aerosol suntan formulation was found to exhibit the same solubility characteristics and ultra-violet absorbing properties as were demonstrated by the formulation described in Example VII.

Summarizing, this invention is seen to provide a novel class of diallyl derivatives of 4-aminobenzoic acid, substituted 4-aminobenzoic acids and its esters as well as novel copolymers prepared therefrom, all of the novel compounds being characterized by their ultra-violet absorbance. In a further aspect, this invention provides the practitioner with novel suntan formulations containing polymeric sun screen agents. Variations may be made in proportions, procedures and materials without departing from the scope of this invention as defined in the following claims.

While no emphasis was placed in using the monomeric diallyl derivatives of this invention in suntan formulations, it is to be noted that they also can be used for such purposes as, for example, in direct replacement of the commonly used p-aminobenzoic acid esters.

What is claimed is:

1. An ethylenically unsaturated derivative of 4-aminobenzoic acid corresponding to the formula:

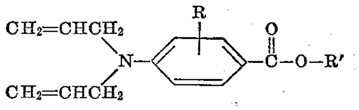

wherein R is a radical selected from a group consisting of hydrogen, lower alkyl and phenyl radicals; and R' is a radical selected from the group consisting of hydrogen, lower alkyl and lower hydroxyalkyl radicals.

2. The ethylenically unsaturated derivative of claim 1 selected from the group consisting of:

4-(N,N-diallylamino) benzoic acid;
2-methyl-4-(N,N-diallylamino) benzoic acid;
3-methyl-4-(N,N-diallylamino) benzoic acid;
2-ethyl-4-(N,N-diallylamino) benzoic acid;
3-ethyl-4-(N,N-diallylamino) benzoic acid;
2-propyl-4-(N,N-diallylamino) benzoic acid;
3-propyl-4-(N,N-diallylamino) benzoic acid;
2-n-butyl-4-(N,N-diallylamino) benzoic acid;
3-n-butyl-4-(N,N-diallylamino) benzoic acid;
2-isobutyl-4-(N,N-diallylamino) benzoic acid;
3-isobutyl-4-(N,N-diallylamino) benzoic acid;
2-sec-butyl-4-(N,N-diallylamino( benzoic acid;
3-sec-butyl-4-(N,N-diallylamino) benzoic acid;
2-t-butyl-4-(N,N-diallylamino) benzoic acid;
3-t-butyl-4-(N,N-diallylamino) benzoic acid;
2-phenyl-4-(N,N-diallylamino) benzoic acid;
3-phenyl-4-(N,N-diallylamino) benzoic acid;
methyl 4-(N,N-diallylamino) benzoate;
ethyl 4-(N,N-diallylamino) benzoate;
propyl 4-(N,N-diallylamino) benzoate ;
n-butyl 4-(N,N-diallylamino) benzoate;
isopropyl 4-(N,N-diallylamino) benzoate;
isobutyl 4-(N,N-diallylamino) benzoate;
sec-butyl 4-(N,N-diallylamino) benzoate;
(2',3'-dihydroxypropyl) 4-(N,N-diallylamino) benzoate;
methyl 2-methyl-4(N,N-diallylamino) benzoate;
methyl 3-methyl-4(N,N-diallylamino) benzoate;
methyl 2-phenyl-4(N,N-diallylamino) benzoate;

ethyl 2-methyl-4(N,N-diallylamino) benzoate;
ethyl 3-methyl-4(N,N-diallylamino) benzoate;
ethyl 2-phenyl-4(N,N-diallylamino) benzoate;
n-propyl 2-methyl-4-(N,N-diallylamino) benzoate;
n-propyl 3-methyl-4-(N,N-diallylamino) benzoate;
isopropyl 2-methyl-4-(N,N-diallylamino) benzoate;
isopropyl 3-methyl-4-(N,N-diallylamino) benzoate;
(2',3'-dihydroxypropyl) 2-methyl-4-(N,N-diallylamino) benzoate; and
(2',3'-dihydroxypropyl) 3-methyl-4-(N,N-diallylamino) benzoate.

References Cited

Theilheimer, W.; *Synthetic Methods of Organic Chemistry* (1959), vol. 13, pub. by S. Karger, N.Y., pp. 245 and 246 relied on.

LORRAINE A. WEINBERGER, Primary Examiner

L. A. THAXTON, Assistant Examiner

U.S. Cl. X.R.

260—80.73, 518 R; 424—60